United States Patent
Eskin et al.

(10) Patent No.: US 7,162,741 B2
(45) Date of Patent: Jan. 9, 2007

(54) SYSTEM AND METHODS FOR INTRUSION DETECTION WITH DYNAMIC WINDOW SIZES

(75) Inventors: Eleazar Eskin, Santa Monica, CA (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 852 days.

(21) Appl. No.: 10/208,402

(22) Filed: Jul. 30, 2002

(65) Prior Publication Data

US 2004/0205474 A1    Oct. 14, 2004

Related U.S. Application Data

(60) Provisional application No. 60/308,621, filed on Jul. 30, 2001.

(51) Int. Cl.
| | |
|---|---|
| *H04L 9/32* | (2006.01) |
| *G06F 11/00* | (2006.01) |
| *G06F 11/22* | (2006.01) |
| *G06F 11/30* | (2006.01) |
| *G06F 11/32* | (2006.01) |
| *G06F 11/34* | (2006.01) |
| *G06F 11/36* | (2006.01) |
| *G06F 12/14* | (2006.01) |
| *G06F 12/16* | (2006.01) |
| *G06F 7/04* | (2006.01) |
| *G06F 7/58* | (2006.01) |

(52) U.S. Cl. .................. 726/25; 726/5; 726/23; 707/205

(58) Field of Classification Search ............ 726/23, 726/25

See application file for complete search history.

(56) References Cited

U.S. PATENT DOCUMENTS

| | | | |
|---|---|---|---|
| 6,647,400 B1 * | 11/2003 | Moran | 707/205 |
| 6,742,124 B1 * | 5/2004 | Kilpatrick et al. | 726/23 |
| 6,963,983 B1 * | 11/2005 | Munson et al. | 726/5 |
| 2002/0138755 A1 * | 9/2002 | Ko | 713/201 |

OTHER PUBLICATIONS

Yoram, Singer—Adaptive Mixtures of Probabilistic Transducers—AT&T Labratories—pp. 1-15.*

(Continued)

*Primary Examiner*—Ayaz Sheikh
*Assistant Examiner*—Arezoo Sherkat
(74) *Attorney, Agent, or Firm*—Baker Botts, L.L.P.

(57) ABSTRACT

A system and methods of monitoring sequences of operations in a process running on a computer system. A probabilistic detection model is defined which is configured to determine a predictive probability of an occurrence of a final operation in the sequence of operations that is conditional on a calculated number of previous operations in the sequence of operations. The probabilistic detection model is trained from a plurality of predetermined sequences of operations to calculate the number of previous operations evaluated in the probabilistic detection model. The predictive probability for the final operation in the sequence of operations is determined by using the probabilistic detection model. If the predictive probability is below a predetermined threshold, the sequence of operations is identified as an intrusion. The probabilistic detection model may use sparse distribution trees to generate a model which determines the optimal number of previous operations to be evaluated (i.e., the window size) and position of wildcards. The system and methods may be used to monitor sequences of system calls, application function calls, and machine code instructions, for example.

19 Claims, 9 Drawing Sheets

OTHER PUBLICATIONS

Singer, Yoram—Adaptive Mixtures of Probabilistic Transducers—AT&T Laboratories—pp. 1-15.*

Marceau, Carla—Characterizing the Behavior of a Program using multiple-length N-grams—Odyssey Research Associates—Ithaca, NY 14850.*

Singer, Yoram and Pereira, Fernando—An Efficient Extention to Mixture Techniques for Prediction and Decision Trees—AT&T Laboratories.*

N. Ye. "A Markov Chain Model of Temporal Behavior for Anomaly Detection," *Proceedings of the 2000 IEEE Systems, Man, and Cybernetics Information Assurance and Security Workshop*, Jun. 6-7, 2000, pp. 171-174.

Y Singer. "Adaptive Mixtures Of Probabilistic Transducers." *Neural Computation*, 1997, 9(8):pp. 1711-1734.

D. Ron, Y Singer, and N. Tishby. "The Power Of Amnesia: Learning Probabilistic Automata With Variable Memory Length." *Machine Learning*, 1996, 25: pp. 117-150.

F. Pereira and Y Singer. "An Efficient Extension To Mixture Techniques For Prediction And Decision Trees."—*Machine Learning*, 1999, 36(3): pp. 183-199.

C. Marceau. "Characterizing the Behavior of A Program Using Multiple-Length N-Grams." *Proceedings of the New Security Paradigms Workshop 2000*, 2000, pp. 101-110.

W Lee and D. Xiang. "Information-Theoretic Measures For Anomaly Detection." *Proceedings of the 2001 IEEE Symposium on Security and Privacy*, May 2001, pp. 1-17.

F. Provost, T. Fawcett, and R Kohavi. "The Case Against Accuracy Estimation For Comparing Induction Algorithms." *Proceedings of the Fifteenth International Conference on Machine Learning*, Jul. 1998, pp. 1-9.

Kymie M. C. Tan, Roy A. Maxion: "'Why 6?' Defining the Operational Limits of stide, and Anomaly-Based Intrusion Detector." *IEEE Symposium on Security and Privacy 2002*, May 12-15, 2002, pp. 188-201.

Eleazar Eskin, William Noble Grundy, Yoram Singer, "Protein Family Classification using Sparse Markov Transducers," *Proceedings of the Eight International Conference on Intelligent Systems for Molecular Biology*, AAAI Press, Menlo Park, CA, 2000.

Matthew Schulz et al. "System And Method For Detection Of New Malicious Executables," filed Jul. 30, 2000, U.S. Appl. No. 10/208,432.

U.S. Appl. No. 10/352,343, filed Jan. 27, 2003 claiming priority to U.S. Appl. No. 60/351,857, filed Jan. 25, 2001, entitled "Behavior Based Anomaly Detection For Host-Based Systems For Detection Of Intrusion In Computer Systems," of Frank Apap, Andrew Honig, Shlomo Hershkop, Eleazar Eskin and Salvatore J. Stolfo.

U.S. Appl. No. 10/352,342, filed Jan. 27, 2003 claiming priority to U.S. Appl. No. 60/351,913, filed Jan. 25, 2002, entitled "Data Warehouse Architecture For Adaptive Model Generation Capability In Systems For Detecting Intrusion In Computer Systems," of Salvatore J. Stolfo, Eleazar Eskin, Matthew Miller, Juxin Zhang and Zhi-Da Zhong.

U.S. Appl. No. 10/327,811, filed Dec. 19, 2002 claiming priority to U.S. Appl. No. 60/342,872, filed Dec. 20, 2001, entitled "System And Methods for Detecting A Denial-Of-Service Attack On A Computer System" of Salvatore J. Stolfo, Shlomo Hershkop, Rahul Bhan, Suhail Mohiuddin and Eleazar Eskin.

U.S. Appl. No. 10/320,259, filed Dec. 16, 2002 claiming priority to U.S. Appl. No. 60/328,682, filed Oct. 11, 2001 and U.S. Appl. No. 60/352,894, filed Jan. 29, 2002, entitled "Methods of Unsupervised Anomaly Detection Using A Geometric Framework" of Eleazer Eskin, Salvatore J. Stolfo and Leonid Portnoy.

U.S. Appl. No. 10/269,718, filed Oct. 11, 2002 claiming priority to U.S. Appl. No. 60/328,682, filed Oct. 11, 2001 and U.S. Appl. No. 60/340,198, filed Dec. 14, 2001, entitled "Methods For Cost-Sensitive Modeling For Intrusion Detection" of Salvatore J. Stolfo, Wenke Lee, Wei Fan and Matthew Miller.

U.S. Appl. No. 10/269,694, filed Oct. 11, 2002 claiming priority to U.S. Appl. No. 60/328,682, filed Oct. 11, 2001 and U.S. Appl. No. 60/339,952, filed Dec. 13, 2001, entitled "System And Methods For Anomaly Detection And Adaptive Learning" of Wei Fan, Salvatore J. Stolfo.

U.S. Appl. No. 10/222,632, filed Aug. 16, 2002 claiming priority to U.S. Appl. No. 60/312,703, filed Aug. 16, 2001 and U.S. Appl. No. 60/340,197, filed Dec. 14, 2001, entitled "System And Methods For Detecting Malicious Email Transmission" of Salvatore J. Stolfo, Eleazar Eskin, Manasi Bhattacharyya and Matthew G. Schultz.

* cited by examiner

SYSTEM AND METHODS FOR INTRUSION DETECTION WITH DYNAMIC WINDOW SIZES

CLAIM FOR PRIORITY TO RELATED APPLICATIONS

This application claims the benefit of U.S. Provisional Patent Application Ser. No. 60/308,621, filed on Jul. 30, 2001, entitled "Modeling System Calls for Intrusion Detection with Dynamic Window Sizes," which is hereby incorporated by reference in its entirety herein.

STATEMENT OF GOVERNMENT INTEREST

The present invention was made in part with support from United States Defense Advanced Research Projects Agency (DARPA), grant no. F30602-00-1-0603. Accordingly, the United States Government may have certain rights to this invention.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods for monitoring system calls in a computer process, and more particularly to the use of data mining techniques to detect intrusions in such computer processes.

2. Background

Intrusion Detection Systems (IDS) are becoming an important part of computer security systems. A major advantage of IDS is the ability to detect new and unknown attacks by examining audit data collected from a system. Typically this detection is performed through a data mining technique called anomaly detection. Anomaly detection builds models of "normal" audit data (or data containing no intrusions) and detects anomalies based on detecting deviations from this normal model. The performance of these models depends greatly on the robustness of the modeling method and the quantity and quality of the available training data. Much of this data is sequential in nature. The basic units of the modeling technique are short contiguous subsequences obtained with a sliding window.

System call traces are a common type of audit data collected for performing intrusion detection. A system call trace is the ordered sequence of system calls that a process performs during its execution. The trace for a given process can be collected using system utilities such as strace. System call traces are useful for detecting a user to root ("U2R") exploit or attack. In this type of exploit, a user exploits a bug in a privileged process (a process running as root) using a buffer overflow to create a root shell. Typically, the system call trace for a program process which is being exploited is drastically different from the program process under normal conditions. This is because the buffer overflow and the execution of a root shell typically call a very different set of system calls than the normal execution of the program.

Because of these differences, it is possible to detect when a process is being exploited by examining the system calls. Other types of audit data that can be analyzed are any system of sequential symbols or operations, such as application call traces or machine code instructions.

Typically, prior art methods build models over short contiguous subsequences of the system call trace. These short continuous subsequences are extracted with a sliding window, which refers to the number of system calls being analyzed. Traditionally, system call modeling methods employ a fixed window size, i.e., a fixed number of system calls are analyzed. There have been many different methods proposed for building models over these short contiguous subsequences. Approaches for modeling normal sequences using look ahead pairs (S. Forrest, S. A. Hofmeyr, A. Somayaji, and T A. Longstaff, "A Sense of Self for Unix Processes." *Proceedings of the 1996 IEEE Symposium on Security and Privacy*, pp. 120–128, IEEE Computer Society, 1996) and contiguous sequences (S. A. Hofmeyr, S. Forrest, and A. Somayaji, "Intrusion Detect Using Sequences of System Calls," *Journal of Computer Security*, 6:151–180, 1998) are described in the prior art. A statistical method to determine sequences which occur more frequently in intrusion data as opposed to normal data is described in P Helman and J. Bhangoo, "A Statistically Based System for Prioritizing Information Exploration Under Uncertainty," *IEEE Transactions on Systems, Man and Cybernetics, Part A: Systems and Humans*, 27:449–466, 1997. A prediction model trained by a decision tree applied over the normal data is described in W Lee, S. J. Stolfo, and P K. Chan, "Learning Patterns from Unix Processes Execution Traces for Intrusion Detection," *Proceedings of the AAAI-97 Workshop on AI Approaches to Fraud Detection and Risk Management*, pp. 50–56. Memo Park, Calif.: AAAI Press, 1997, and W Lee and S. J. Stolfo, "Data Mining Approaches for Intrusion Detection, *In Proceedings of the Seventh USENIX Security Symposium*, 1998. Ghosh and Schwartzbard describe neural networks to model normal data (A. Ghosh and A. Schwartzbard, "A Study in Using Neural Networks for Anomaly and Misuse Detection, *In Proceedings of the Eighth USENLY Security Symposium*, 1999). Ye describes a Markov chain-based method to model the normal data (N. Ye, "A Markov Chain Model of Temporal Behavior for Anomaly Detection," *In Proceedings of the 2000 IEEE Systems, Man, and Cybernetics Information Assurance and Security Workshop*, 2000).

Each of these methods attempt to predict whether a subsequence is more likely to have been generated by a normal process. Typically, the only data that is available is normal data, so this corresponds to predicting how likely an observed sequence is normal or is consistent with the normal data. One way to do this is to use a "prediction" model. For a sequence of length n, such a model computes how likely the first n−1 system calls predict the nth system call. The more consistent the subsequence is with the normal data, then the more accurate the prediction.

A disadvantage of all of the above methods is that they use a fixed window size for building the system call trace models, or models of other sequences of operations. The size of the window is picked a priori presumably based upon a determination of what size works best for the modeling. There is a tradeoff between using shorter or longer sequences. To analyze this tradeoff, Σ is considered the set of all distinct symbols, in which each symbol represents a distinct operation in a sequence of operations. For example, if the sequence of operations is a sequence of operating system calls made by a program, then the name of the operating system may serve as a distinct symbol. Assuming all sequences occur with equal probability and that there are |Σ| different operations, a specific n length sequence will occur with probability $$\frac{1}{|\Sigma|^n}.$$

In general, if longer sequences are used, there are significantly fewer instances of each subsequence in the data. However, these instances are more accurate than short sequences. Shorter sequences occur much more frequently, but often are not as accurate as longer sequences. Motivated by this tradeoff there is some optimal sequence length for the models. In related work, Marceau (as described in C. Marceau, "Characterizing the Behavior of a Program Using Multiple-Length n-Grams," *In Proceedings of the New Security Paradigms Workshop* 2000) identifies the problems of determining a fixed window size and avoids the problem by presenting a model of using multiple sequence lengths for building these kinds of models.

However, this filter lacks the ability to define optimal sequence lengths that are determined by a data analysis of the available training data.

Accordingly, there exists a need in the art for a technique which is not limited to a fixed window size for analyzing sequential behavior and which provides the ability to detect intrusions in the operation of the computer system.

SUMMARY

An object of the present invention is to provide a technique for detecting intrusions by identifying anomalies in sequential behavior on a computer system.

Another object of the present invention is to provide a data mining technique which determines an optimal window size for modeling sequential behavior.

A further object of the present invention is to provide an intrusion detection system which provides an efficient update of the detection model.

These and other objects of the invention, which will become apparent with reference to the disclosure herein, are accomplished by a system and methods for monitoring sequential behavior performed during execution of a process on a computer system to detect an intrusion from normal operation of the computer system. The sequential behavior refers to any sequence of symbols or operations that can be audited during the operation of a process by the computer system. In a preferred embodiment, the sequence of operations may be a sequence of system calls. According to other embodiments, the sequence of operations may be application function calls or machine code instructions. The method includes building a probabilistic detection model which is configured to determine a predictive probability of an occurrence of a final system call in the sequence of system calls that is conditional on a calculated number of previous system calls in the sequence of system calls. The probabilistic detection model is trained from a plurality of predetermined, or training, sequences of system calls to calculate the optimal number of previous system calls analyzed. The predictive probability for the final system call in the sequence of system calls is determined by using the probabilistic detection model by evaluating the number of previous system calls as determined by the model. If the predictive probability is below a predetermined threshold, the sequence of system calls is identified as an intrusion.

In a preferred embodiment, the probabilistic detection model defines a sparse prediction tree for determining a predictive probability of the final system call. The sparse prediction tree comprises a plurality of nodes consisting of a root node, leaf nodes, and branch nodes intermediate to the root node and the leaf nodes, such that each of the conditioning sequence of system calls defines a path from the root node to one of the leaf nodes. A probability distribution over each of the conditioning sequences of system calls is associated with each of the leaf nodes. The paths between adjacent nodes may be associated with a predetermined system call. Alternatively the path between adjacent nodes may be associated with any system call, that is, a wildcard.

Advantageously, a plurality of the sparse prediction trees are defined and a respective weight is provided to each of the sparse prediction trees. The plurality of sparse detection trees includes a variety of depths, i.e., the number of system calls in the sequence (window size) and positioning of wild cards. The predictive probability of the probabilistic model may be defined as a weighted sum of the predictive probabilities determined by all of the plurality of sparse prediction trees divided by a sum of all of the respective weights. The respective weights of each of the sparse prediction trees may be updated by reference to conditional sequences of system calls.

In accordance with the invention, the objects as described above have been met, and the need in the art for a technique which optimizes the intrusion detection model including window size and positioning of wild cards, has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
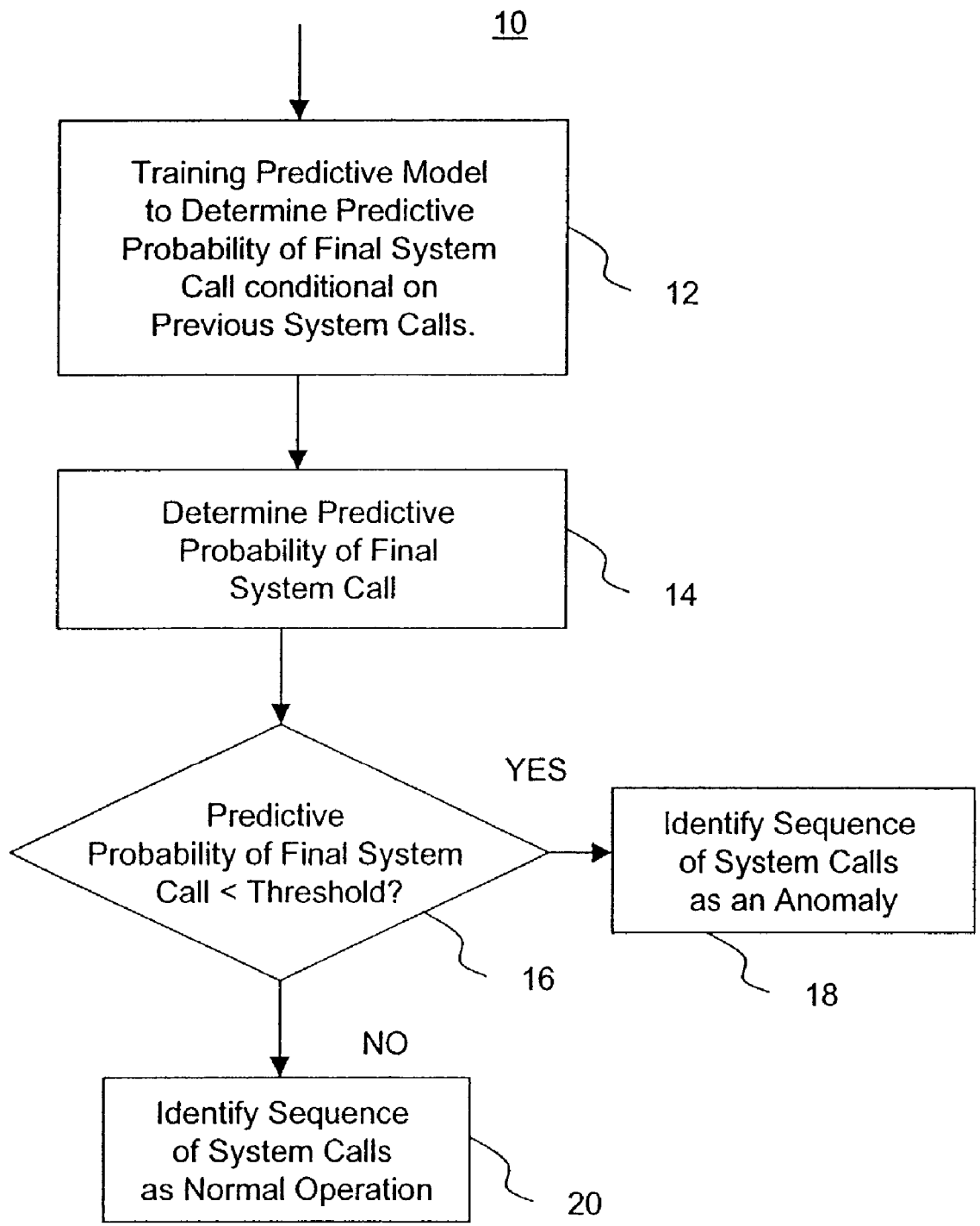
FIG. 1 is a flow chart illustrating an overview of a method of detection model generation in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

This invention will be further understood in view of the following detailed description.

In accordance with the invention, a system and method for detecting an anomaly in a sequence of system calls on a computer system is disclosed herein. An exemplary method is illustrated in FIG. 1 and designated method 10. System call traces are modeled by estimating a context dependent "predictive" probability. As will be described below, a call graph framework is useful for describing the possible execution paths of various system calls.

Although the system and methods are described in terms of monitoring system call traces, it is understood that the invention is useful in monitoring any sequential behavior that is capable of being audited, such as sequences of application calls or machine code instructions.

At step 12, a predictive model is trained based on predetermined (known) sequences of system calls, i.e., "normal" sequences of system calls to determine the probability of predicting the final system call in a sequence of system calls given the previous calls in the sequence of system calls. This probability estimation takes into account the context dependent nature of the data. Once this model is trained over normal data from a given program, a predictive probability distribution is created for that program.

When evaluating new sequence of system calls to determine whether or not they correspond to anomalies, e.g., intrusions or exploits, the predictive probability is determined for each subsequence at step 14. If the sequence probability is below a predetermined threshold (step 16), then the sequence of system calls being evaluated is unlikely to have originated from a normal process and the process trace is declared an exploit or attack (step 18). If the sequence probability is above the threshold, the sequence of system calls is considered normal operation (step 20). Each of the steps listed above will be described in greater detail herein.

The stage of training a predictive model (step 12) includes determining an optimal window size. According to the exemplary embodiment, the window sizing is variable and context dependent. The motivation for a context dependency of the window size is derived from the underlying mechanism of how a process executes. As is known in the art, a system call trace is a sequence of all of the system calls that a process of a given program makes during its lifetime. The system calls in the trace depend on the execution path of the process. A process execution path depends on many factors such as inputs to the process as well as the state of the system. These factors determine which execution path a process takes at each possible branch point.

Figure 2:
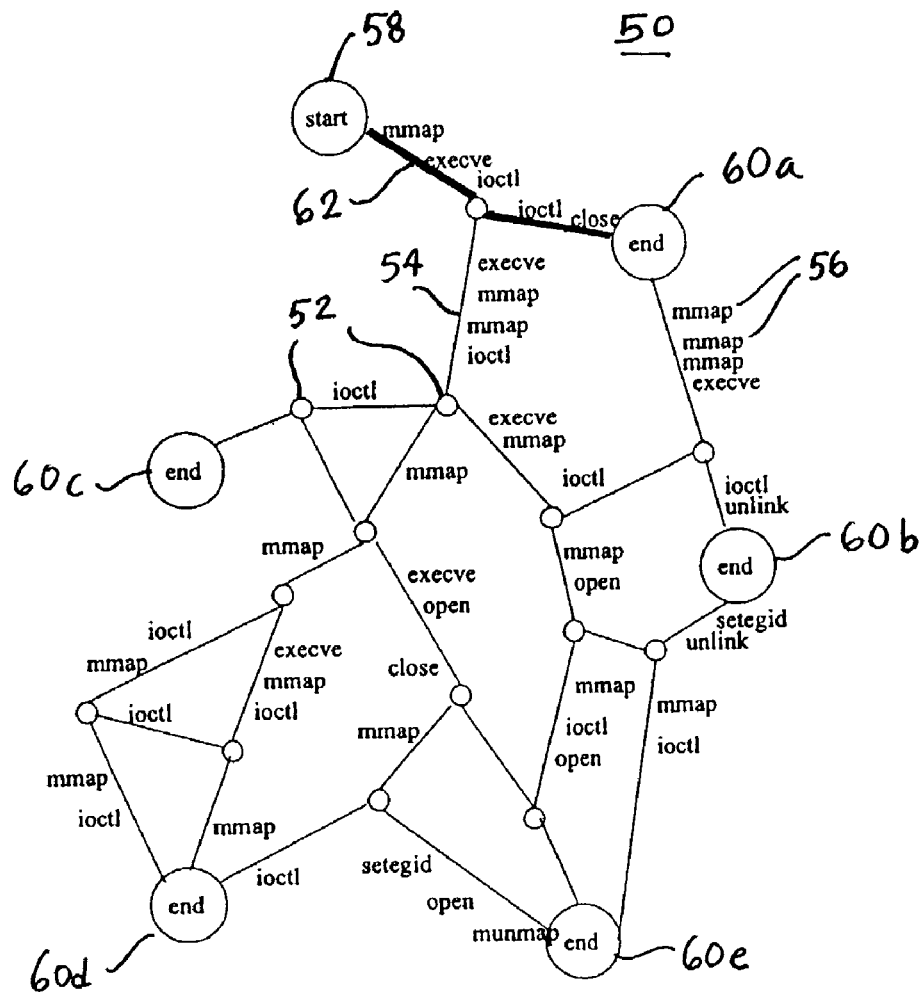
FIG. 2 is a sample call graph and execution trace

The set of all possible execution paths of a program is modeled using a "call graph". An example of a call graph and an execution path is shown in FIG. 2. The call graph models the program structure and defines the possible execution paths. A call graph is a graph 50 where each path through the graph is a possible path of execution of a process of a program. The nodes 52 of the graph correspond to possible branch points of the program, and the edges 54 of the graph are labeled with the system calls 56 between the branch points. There is a defined start node 58 for the graph and at least one end node 60a, 60b, 60c, 60d, 60e. An execution path 62 (shown in bold) of a process is a path through the call graph associated with a program. A system call trace is simply the system calls along the edges of the execution path of the process. Thus, an exemplary system call trace from start node 58 to end node 60a includes the system calls mmap, execve, ioctl, ioctl, and close.

Although a call graph exists for every program, it is typically difficult to actually obtain this graph in practice. The graph depends on the source code of the program as well as the compiler used and the specifics of the operating system. Even with the source code available, it is often impractical to recreate the call graph from the observed system call traces. Although it may impossible to determine the specific call graph for a program, a call graph is nevertheless presumed to exist for each program. The existence of the call graph is a premise on which the novel predictive model is derived.

The execution paths in a call graph typically refer to sequence of system calls that occur during normal operation. However, there is a set of execution paths that correspond to exploits or attacks. The goal of the system call modeling method is to be able to determine whether a short subsequence of system calls corresponds to a normal execution path or to an exploit execution path. Theoretically given access to the program's call graph that was labeled with normal and exploit paths, the subsequence could be matched with the location where it uniquely occurs in the call graph. The tradeoff between longer and shorter sequences, described above, is made explicit in the context of the call graph: While a longer sequence can more likely identify a unique portion of the call graph, however, it is often too long to fit within a single edge and must span several branch points. For this sequence to be observed multiple times, the states of the different processes where the longer sequence occurs will all have to force the execution paths to be the same with regard to those branches. This can introduce noise into the model. Shorter sequences on the other hand, span fewer branches. However, these shorter sequences can occur in multiple points in the call graph causing it to be difficult to determine uniquely where the short subsequence came from and whether the short subsequence corresponds to an exploit trace or a normal trace.

Ideally, for any given subsequence, it would be desirable to take the shortest subsequence that uniquely (or almost uniquely) identifies the location of the call graph that generates this subsequence. Because the branch points occur in different places, the optimal length of the subsequence depends on the specific system calls in the subsequence. Hence, the optimal window size is context dependent.

Figure 3:
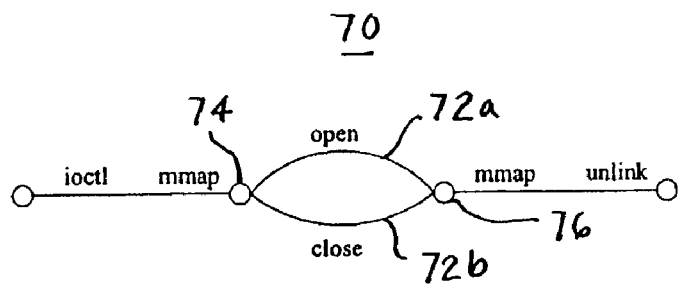
FIG. 3 is a portion of sample call graph corresponding to a single call branch.

Another common feature of call graphs is that there often is a branch which affects a single system call. An example of a branch 70 in a call graph is shown in FIG. 3. In this portion of the call graph, there are two possible traces through it, ioctl mmap open mmap unlink and ioctl mmap close mmap unlink. Because there are two possibilities, the amount of observed system call traces from this portion of the call graph are split into two parts 72a and 72b between nodes 74 and 76. As discussed in the context of longer sequences, this is not optimal for modeling It would be more desirable to group these two sequences into a single category. This can be achieved by including a "wild card" in the subsequence. Both of the subsequences can fit into the model of ioctl mmap * mmap unlink. Again, the placements of the wildcards are context dependent relating to the call graph. This motivates the incorporation of context dependent wild cards into the model. Thus certain edges of the call graph may be (1) labeled with a single, particular system call, or alternatively, (2) labeled with a wild card which may be associated with any system call.

The details of the predictive model of the exemplary embodiment is described herein. In order to determine whether a system call trace subsequence corresponds to an exploit or normal trace, a probabilistic prediction model is used which predicts the final (nth) system call given the previous (n−1) system calls in the subsequence. In this model, a probability estimate of the final system call is used which is conditional on the sequence of previous system calls. Thus, the size of the window and the placement of the wild cards correspond to the length of the conditioning sequence (the sequence of previous system calls) and the specific positions in the conditioning sequence on which the probability is conditioned. To model this type of probability distribution, sparse Markov transducers ("SMTs") are used. It is understood that other predictive models may also be used in accordance with the principles described herein.

The prediction model is equivalent to computing the conditional probability of equation (1)

$$P(X_n|X_{n-1}X_{n-2}X_{n-3}X_{n-4} \ldots X_1) \qquad (1)$$

where $X_k$ are random variables over the set of system calls $\Sigma$. In this probability distribution, the final system call $X_n$ is conditional on the n−1 previous system calls.

As motivated by call graphs, described above, the probability distribution may be conditioned on some of the system calls and not on others. The different window sizes correspond to different lengths of the conditional sequence. For example, if the optimal window size for a given context is n=4, then the probability distribution would be conditional only on the first 3 system calls in the sequence $(X_3X_2X_1)$. Depending on the specific system calls in sequence, there may be a different value of n.

Also dependent on the context is the placement of wild cards. For any given sequence, the conditioning sequence contains wild cards. For example, if the optimal window size for a given context is n=5, with the third system call being a wild card, the conditioning sequence will be $X_4*X_2X_1$ where the symbol * represents a wild card. The notation *$^n$ is to represent n consecutive wild cards.

SMTs are used to model system call traces by estimating a context dependent "predictive" probability as motivated by the call graph framework. This is the probability of predicting the final system call in a subsequence given the previous subsequences. This probability estimation takes into account the context dependent nature of the data. Once this model is trained over normal data from a given program, e.g., a predetermined sequence of system calls, a predictive probability distribution is created for that program. As will be described below, the predictive probability is computed for each subsequence when evaluating new program traces to determine whether or not they correspond to exploits. If the subsequence probability is below some threshold, then the subsequence trace is very unlikely to have originated from a normal process and the process trace is declared an exploit or attack. The value of the threshold defines the tradeoff between the detection rate and the false positive rate of the system. Higher thresholds will mean more traces will be reported as exploits, consequently meaning a higher detection rate at a potentially higher false positive rate. Likewise, lower thresholds will mean fewer traces will be reported as exploits, which gives a lower false positive rate at a potentially lower detection rate. Because of this tradeoff, the system is evaluated under many different thresholds as described below.

Figure 4:
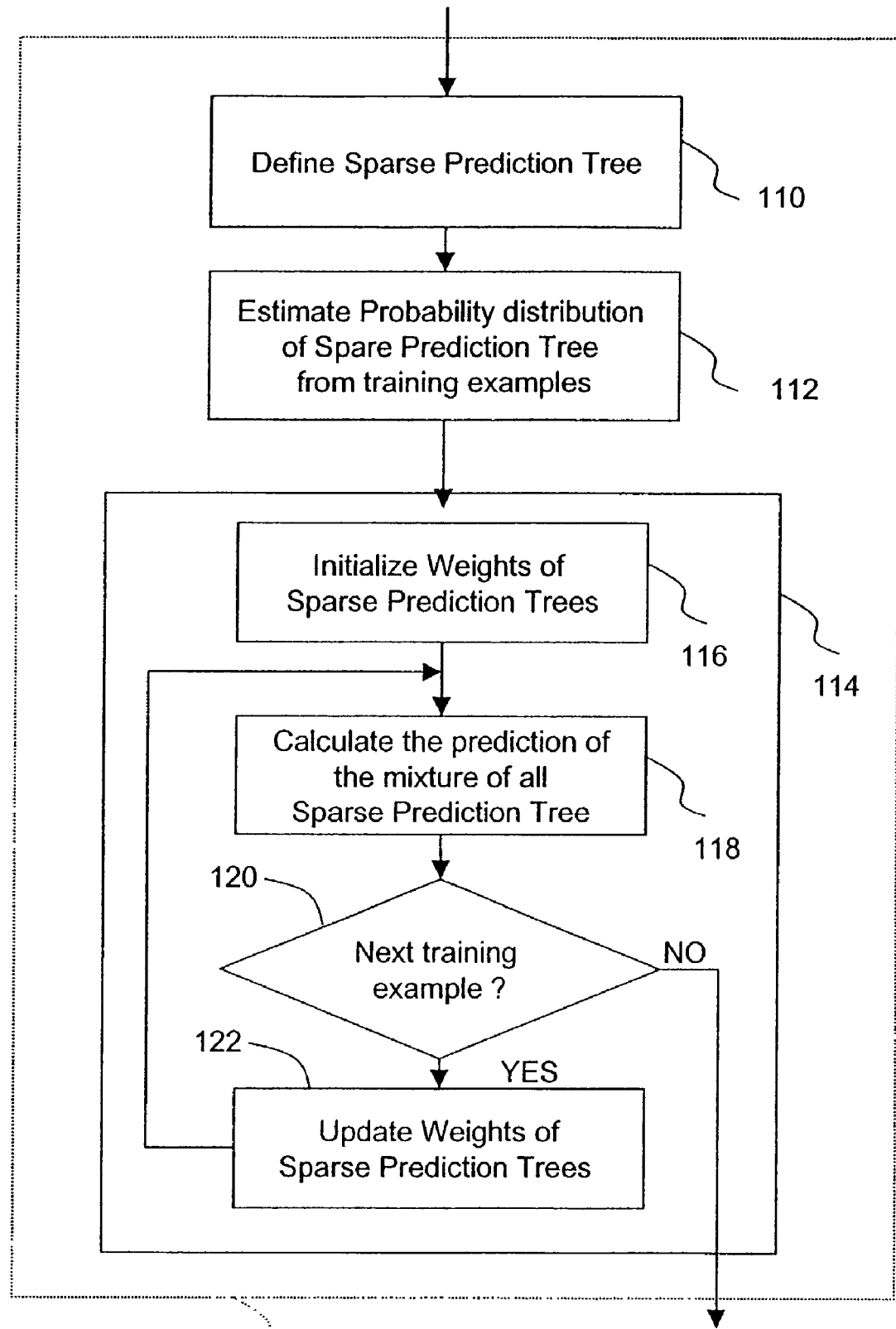
FIG. 4 is a flow chart illustrating a portion of the method illustrated in FIG. 1 in greater detail.

An exemplary method for building the predictive model (step 12 of FIG. 1) is illustrated in greater detail in FIG. 4. It is understood that other techniques may be used to build the predictive mode, such as for example, Hidden Markov Models (HMM's) a general technique which is commonly known in the art. First, a type of prediction suffix tree called a sparse prediction tree is defined (step 110). A sparse prediction tree, which is representationally equivalent to a SMT, probabilistically maps input strings (e.g., the previous system calls) to a probability distribution over the output symbols (e.g., the final system call in the sequence of system calls). The topology of a tree encodes (1) the context dependent length, i.e., the window size, and (2) the positions of the wild-cards in the conditioning sequence of the probability distribution. Next, the probability distributions of a plurality of these trees is estimated from the set of examples (Step 112). Since a priori the optimal window sizes or positions of the wild-cards are not known, the best tree topology is also not known. For this reason, a mixture (weighted sum) of trees is calculated subsequently (step 114). During this stage, the weights of the tree weight are updated based on their performance over the set of examples (step 122). The trees are updated so that the better performing trees get larger weights while the worse performing trees get smaller weights. Thus the data is used to choose the depth, i.e., the number of previous system calls, and the positions of the wild-cards in the conditioning sequence.

Figure 5:
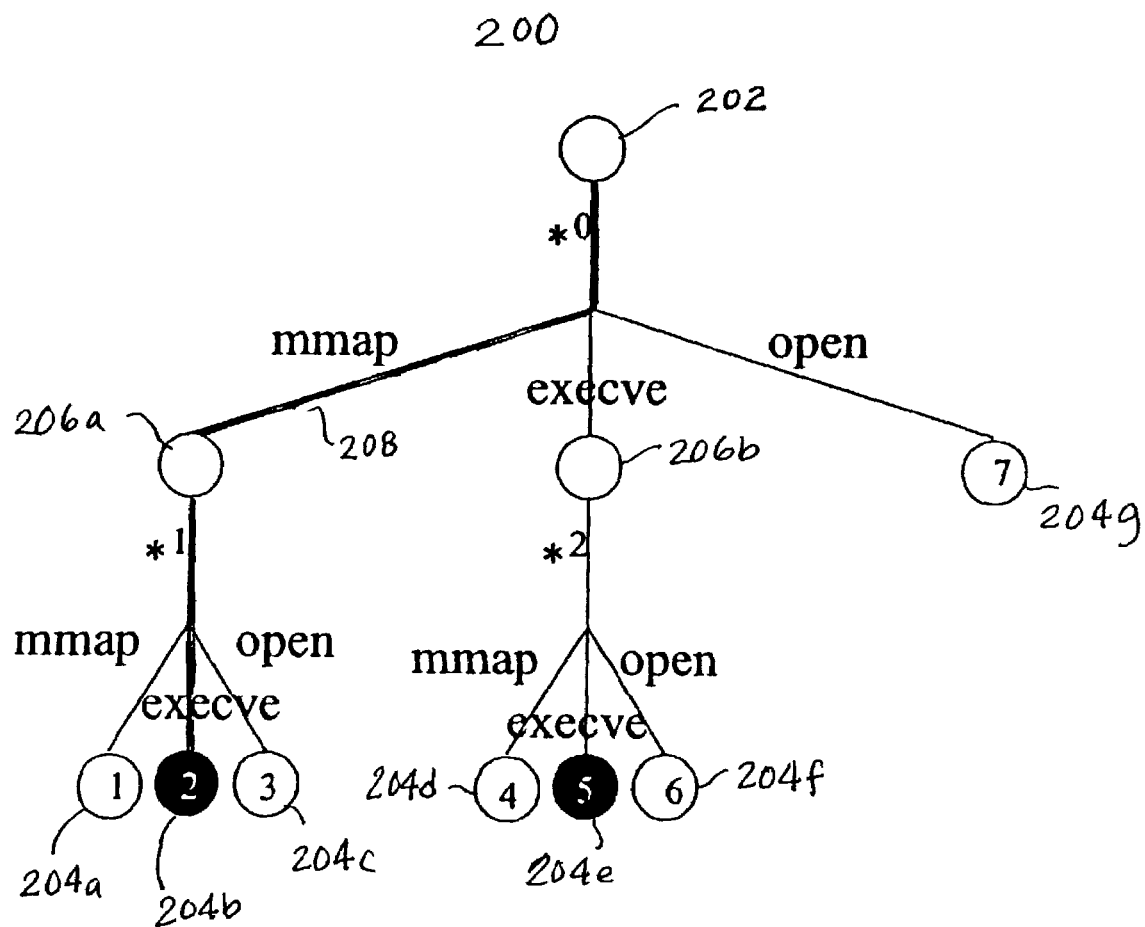
FIG. 5 is an exemplary sparse Markov tree in accordance with the present invention.

As discussed above, to model SMTs, a sparse prediction tree is defined (step 110 of FIG. 4). A sparse prediction tree is a rooted tree where each node is either a leaf node or contains one branch labeled with *$^n$ for n≧0 that forks into a branch for each element in $\Sigma$ (each system call). Each leaf node of the tree is associated with a probability distribution over the system calls, $\Sigma$. FIG. 5 illustrates a typical SMT 100. Root node 202 is illustrated in the FIG., along with leaf nodes 204a–204g, and branch nodes 206a–206b are intermediate to the root node 202 and the leaf nodes 204a–204g. In this tree, leaf nodes, such as leaf node (1) 204a, . . . leaf node (7) 204g, each are associated with a probability distribution. A path, such as exemplary path 208 (illustrated in bold), from the root node 202 to a leaf node, such as leaf node (1) 204a, represents a conditioning sequence of system calls in the probability distribution. Each node is labeled using the path from the root of the tree to the node. Because the path contains the wild-card symbol *, there are multiple strings over $\Sigma$ that are mapped to a single node. A tree associates a probability distribution over output symbols (e.g., final system call) conditioned on the input sequence (e.g., conditioning sequence) by following an input sequence from the root node to a leaf node skipping a symbol in the input sequence for each * (wildcard) along the path. The probability distribution conditioned on a system call sequence is the probability distribution associated with the leaf node that corresponds to the system call sequence. The length of the conditioning sequence, i.e., the number of system calls in the sequence being analyzed, corresponds to the depth of a leaf node in the tree. Thus the conditioning sequence length is different for different paths in the tree. Also, the wild cards are in different places for different paths in the tree. Thus a tree makes explicit the choices of context dependent length and placement of wild cards. As described below, the tree is trained with a training set of system call length n−1, subsequences $x_{n-1}x_{n-2} \ldots x_1$, and their corresponding nth system call $x_n$.

For example, in FIG. 5, the sets of input strings that correspond to each of the two highlighted nodes are mmap * execve which corresponds to node (2) 204b and execve *$^2$ execve which corresponds to node (5) 204e. According to the invention, the two nodes would correspond to any system call sequences mmap * execve and execve * * execve where * denotes a wild-card. Node (2) 204b in FIG.

5 corresponds to many sequences including mmap execve execve and mmap mmap execve. Similarly, node (5) 204e in FIG. 5 corresponds to the sequences execve mmap mmap execve and execve mmap open execve. Also execve mmap open execve mmap corresponds to node (5) 204e because the prefix of the sequence corresponds to node (5) 204e. The probability corresponding to an input sequence is the probability contained in the leaf node corresponding to the sequence. In this example P(open|mmap execve execve) would be the probability of the symbol open in the probability distribution associated with node (2) 204b.

A sparse prediction tree, T, can be used to compute a context dependent predictive probability for system call windows. For a training example pair containing a final system call $x_n$ (output) and an input sequence $x_{n-1}$ $x_{n-2}$ ... $x_1$, the conditional probability for the example can be determined, denoted $P_T(x_n|x_{n-1} x_{n-2} \ldots x_1)$. As described above, first the node u which corresponds to the conditioning sequence is determined. Once that node is determined, the probability distribution over output symbols associated with that node is used. The prediction of the tree for the example is then:

$$P_T(x_n|x_{n-1} x_{n-2} \ldots x_1) = P_T(x_n|u) \quad (2)$$

A prediction tree is trained from a set of training examples of system calls trace subsequences (step 112 of FIG. 4). The conditioning sequences are the first n−1 sequences and the prediction is the nth subsequence.

Each leaf node 204 maintains counts of each system call that reaches the leaf node 204. Each count may be smoothed by adding a constant value to the count of each output symbol. The predictor's estimate the probability for a given output is the smoothed count for the output divided by the total count in the predictor.

With continued reference to FIG. 5, all of the predictors (in leaf nodes (1) 204a, ..., leaf node (7) 204g) are first initialized to the initial count values. If for example, the first element of training data is the system call mmap ($x_n$) preceded by the sequence mmap open execve ($x_{n-1}$ $x_{n-2}$, ...), the leaf node that corresponds to the sequence would be identified. In this case the leaf node would be node (2) 204b. The predictor in node (2) 204b is then updated with the system call mmap by adding 1 to the count of mmap in node (2) 204b. Similarly, if the next nth system call execve and is corresponding preceding sequence is mmap execve execve mmap, the predictor in node (2) 204b is then updated with the system call execve. If the next system call is open and corresponding sequence is mmap mmap mmap mmap execve, node (1) 204a is then updated with the system call open.

After training on these three examples, the tree can be used to output a prediction for a sequence by using the probability distribution of the node corresponding to the sequence. For example, assuming the initial count is 0, the prediction of the input sequence mmap mmap execve which correspond to the node (2) 204b and would give the probability for execve as 0.5 and the probability of mmap as 0.5. The probability of execve (0.5) is the count (1) of execve in the node divided by the total count (2) in the node. Similarly, the probability of mmap (0.5) is the count (1) of mmap divided by the total count (2).

Since the optimal size of the window or the location of the wild-cards is generally not known a priori, it is also not known which particular tree topology can best estimate the distribution. Consequently, a mixture technique is used which employs a weighted sum of a plurality of trees as the predictor, instead of using a single tree (step 114 of FIG. 5).

Several tree configurations are generated having a variety of window sizes and/or wild card locations are created and evaluated (this process of generating the trees is also described in greater detail in Appendix A). The training data is used in order to learn which of these trees predicts most accurately.

A Bayesian mixture approach is used for the problem. Subsequently, a Bayesian update procedure is used to update the weight of each tree based on its performance on each element of the dataset. In this way, the weighted sum uses the data to make the best prediction. In order to mix the tree predictions, the weights in the mixture are initialized to the prior probabilities of the trees (step 116). Then the weight of each tree is updated for each training example in the training set based on how well the tree performed on predicting the last symbol in the window (step 122). At the end of this process, a weighted sum of trees is determined in which the best performing trees in the set of all trees have the highest weights.

Specifically, a weight, $w_T^t$, is assigned to each tree in the mixture after processing training example t (denoted with superscript t). The prediction of the mixture after training example t is the weighted sum of all the predictions of the trees divided by the sum of all weights:

$$P^t(x_n^t | x_{n-1}^t \ldots x_1^t) = \frac{\Sigma_T w_T^t P_T(x_n^t | x_{n-1} \ldots x_1^t)}{\Sigma_T w_T^t} \quad (3)$$

where $P_T(x_n^t|x_{n-1}^t \ldots x_1^t)$ is the prediction of tree T for sequence $x_{n-2}^t \ldots x_1^t$ (step 118 of FIG. 4).

The prior probability of a tree $w_T^1$, may be defined using the topology of the tree. The more complicated the topology of the tree the smaller its prior probability.

A Bayesian update rule is used to update the weights of the mixture for each training example (step 122 of FIG. 4). The mixture weights are updated according to the evidence which is simply the probability of the final system call $x_n^t$ given the input sequence $x_{n-1}^t x_{n-2}^t \ldots x_1^t$, $P_T(x_n^t|x_{n-1}^t \ldots x_1^t)$. The prediction is obtained by updating the tree with the training example and then computing the prediction of the training example. Intuitively, this gives a measure of how well the tree performed on the given example. The unnormalized mixture weights are updated using the following rule:

$$w_T^{t+1} = w_T^t P_T(x_n^t|x_{n-1}^t x_{n-2}^t \ldots x_1^t) \quad (4)$$

with $w_T^1$ is defined to be the prior weight of the tree. Thus the weigh of a tree is the prior weight times the evidence for each training example:

$$w_T^{t+1} = w_T^1 \prod_{i=1}^{t} P_T(x_n^t | x_{n-1}^t x_{n-2}^t \ldots x_1^t) \quad (5)$$

After training example t, the weights for every tree T are updated. Since the number of possible trees are exponential in terms of the maximum allowed tree depth, this update algorithm requires exponential time.

However, SMTs can be computed efficiently in both time and space. An efficient update algorithm that computes the exact mixture weights is discussed in Appendix A The weight update algorithm is identified in equations (A13) and (A15) of Appendix A. The efficient algorithm stores and updates weights in the nodes of the tree and uses those weights to compute the mixture of sparse Markov trees. The algorithm for node weight updates does not require exponential time (Appendix B). The routine updateL in the appended code calculates the weight update as indicated in the comment lines. This equation uses logarithmic probabilities to avoid underflow in the numerical computations.

The method described herein was implemented on a personal computer (PC) running Linux. The system includes a probabilistic detection model generator and a intrusion detector. Probabilistic detection model generator builds the predictive probability of the occurrence of a final system call in the sequence of system calls conditional on previous system calls in the sequence of system calls. In the exemplary embodiment, SMTs were used to build the probabilistic detection model, although other techniques may be used, such as HMM's. The probabilistic detection model may be trained from a plurality of conditioning sequences of system calls. Two sets of system call data containing intrusions were examined. A training set was used for the probabilistic detection model generator. A test set was used by the intrusion detector. In both of these sets, there was a set of normal traces and a set of intrusion traces. The intrusion detector determines the predictive probability for the final system call in the sequence of system calls by using the probabilistic detection model. If the predictive probability is below a predetermined threshold, the sequence of system calls is identified as an intrusion.

The first set of data is from the BSM (Basic Security Module) data portion of the 1999 DARPA Intrusion Detection Evaluation data created by MIT Lincoln Labs (as described in MIT Lincoln Labs, "DARPA Intrusion Detection Evaluation," online publication http://www.ll.mit.edu/IST/ideval/index.html, 1999) which is incorporated by reference in its entirety herein). The data consists of 5 weeks of BSM data of all processes run on a Solaris machine. Three weeks of traces of the programs which were attacked during that time were examined. The programs attacked were: eject, ps (LL), and jtp.

The second set of data was obtained from Stephanie Forest's group at the University of New Mexico. This data set is described in detail in C. Warrender, S. Forrest, and B. Pearlmutter, "Detecting Intrusions Using System Calls: Alternative Data Models," *Proceedings of the 1999 IEEE Symposium on Security and Privacy*, pp. 133–145. IEEE Computer Society, 1999, which is incorporated by reference in its entirety herein). This data contains up to 15 months of normal traces for certain programs as well as intrusion traces. The data provides normal and intrusion traces of system calls for several processes. The data for the processes that were attacked with a "user to root" attack were examined. The processes examined correspond to the programs: named, xlock, login, and ps (UNM).

Tables 1 and 2 summarize the data sets and list the number of system calls and traces for each program. Traces from each program in each data set were separated into a disjoint training and testing portion. The training set contained approximately ⅔ of the traces and the test set contained the remaining traces. Training and testing were performed on different sets of data in order to simulate how the method may work in practice, i.e., testing a model against data that has not been observed when building the model.

The method according to the invention was compared against two methods, stide and t-stide, shown to be effective in detecting intrusions in system call data when trained over clean data in experiments performed on the University of New Mexico data set. The context based method was also compared to fixed window size prediction models of different sizes.

The sequence time-delay embedding (stide) algorithm keeps track of what sequences were seen in the training data and detects sequences not seen in training. The method builds a model of normal data by making a pass through the training data and storing each unique contiguous sequence of a predetermined length in an efficient manner. A length of six is used because that is the length of the sequences used in the published results of the method.

When the method is used to detect intrusions, the sequences from the test set are compared to the sequences in the model. If a sequence is not found in the normal model, it is called a mismatch or anomaly.

The threshold sequence time-delay embedding (t-stide) algorithm is an extension of the stide algorithm which incorporates a threshold. In addition to unknown sequences, rare sequences are also counted as mismatches. In this method, any sequence accounting for less than 0.001% of the total number of sequences is considered rare.

To detect intrusions, these methods compare the number of mismatches in a local region of 20 consecutive sequences. A threshold is set for these local regions between 1 and 20. If the number of mismatches reaches or exceeds the local mismatch threshold, the process is declared an intrusion.

The performance of the method according to the invention is compared with the baseline methods described above. The novel methods presented herein outperform the baseline methods when trained over the same dataset.

If a process trace contains an anomaly, that process is declared an intrusion. An intrusion detected is considered detected if either the intrusion process is detected, or one of the processes spawned by the intrusion is detected.

The anomaly detection methods in both sets of experiments are compared using Receiver Operation Characteristic (ROC) curves which graph the false positive rate versus the detection rate (further details of ROC curves are described in F. Provost, T. Fawcett, and R Kohavi, "The Case Against Accuracy Estimation for Comparing Induction Algorithms," *Proceedings of the Fifteenth International Conference on Machine Learning*, July 1998 which is incorporated by reference in its entirety herein). The detection rate is the percentage of intrusions which are detected. In order to be consistent with previous published results on these data sets, the false positive rate is defined to be the percentage of normal system calls which are declared anomalous. The threshold of the methods is varied to obtain multiple points on the ROC curve. The ROC curves have few points because of the small amount of intrusion traces in each data set. In the ROC curves, the optimal detector is the graph closest to the y-axis, i.e., having the highest detection rate with minimum false positive rate.

Figure 6:
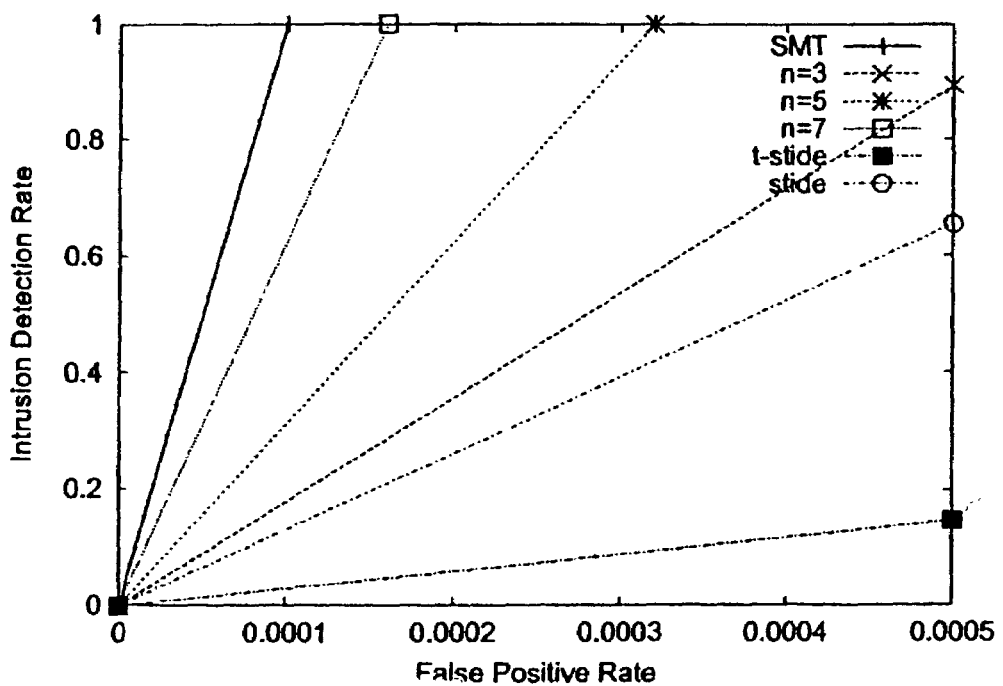
FIGS. 6–12 illustrate plots showing the relationship of intrusion detection rate versus false positive rate for several sets of data.
Figure 7:
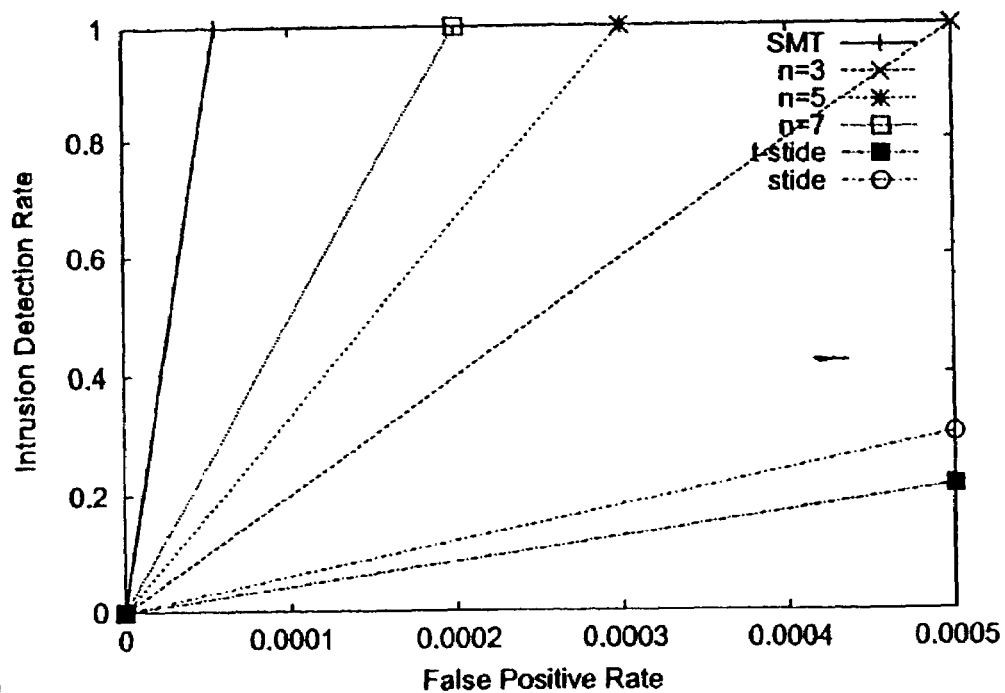
Figure 8:
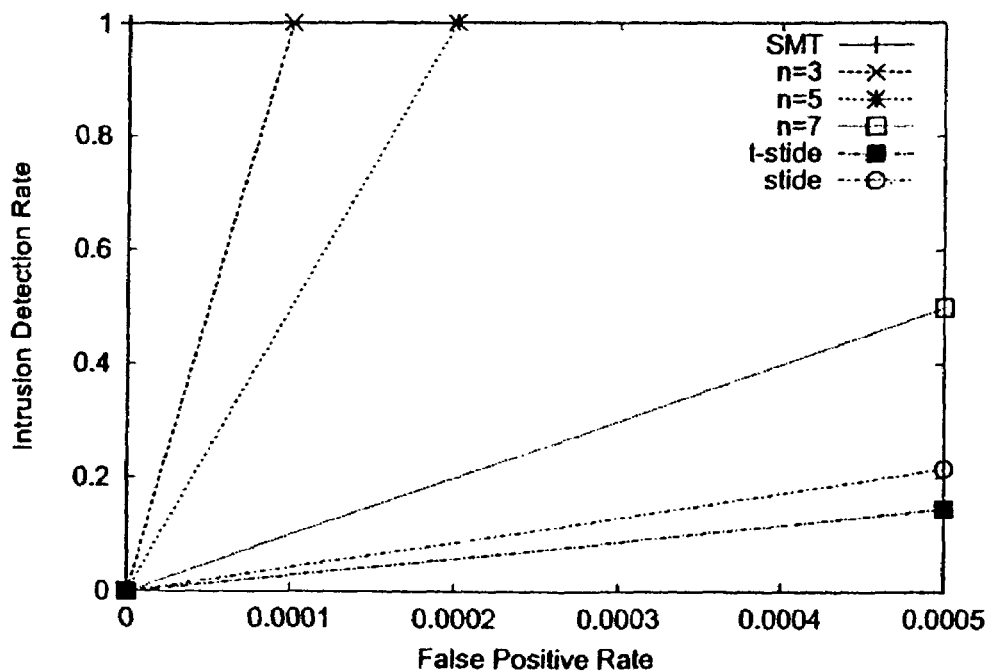
Figure 9:
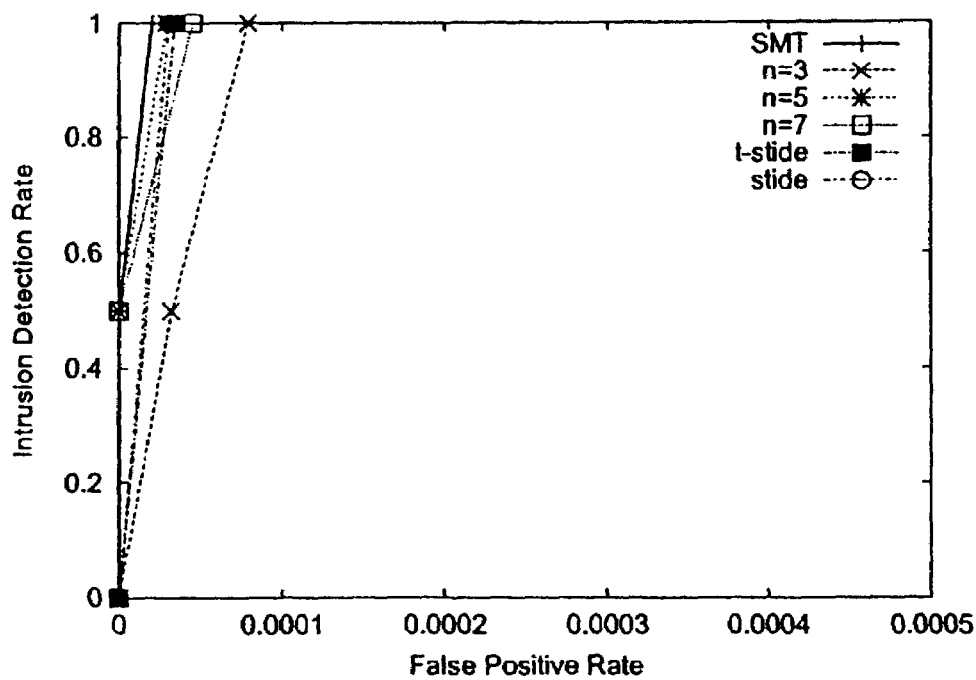
Figure 10:
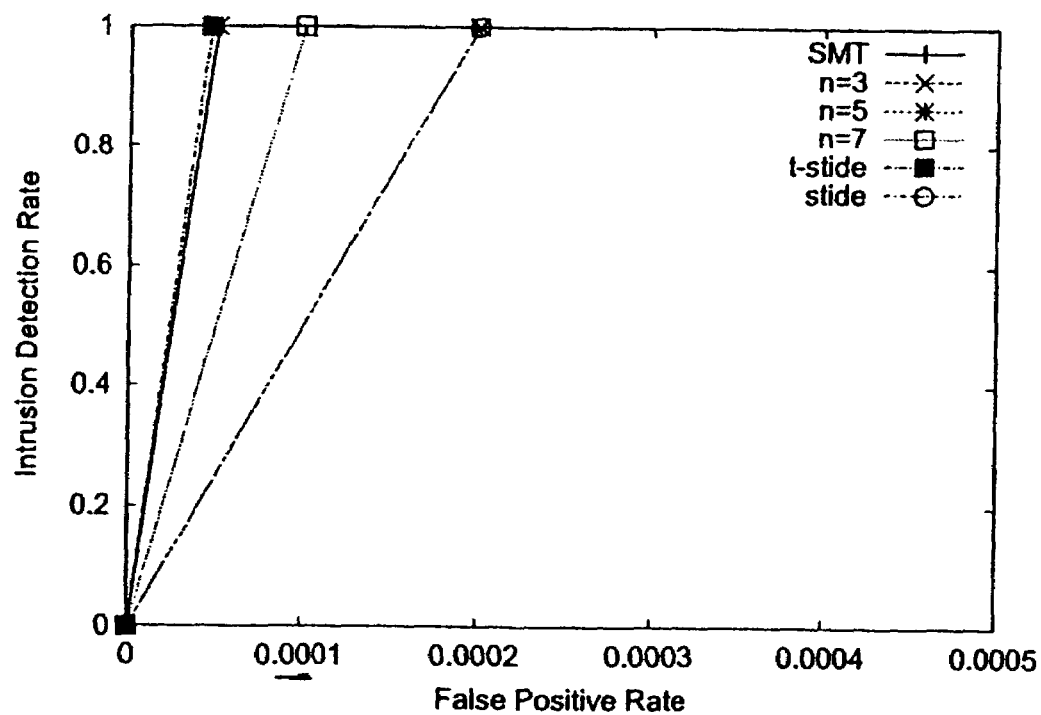
Figure 11:
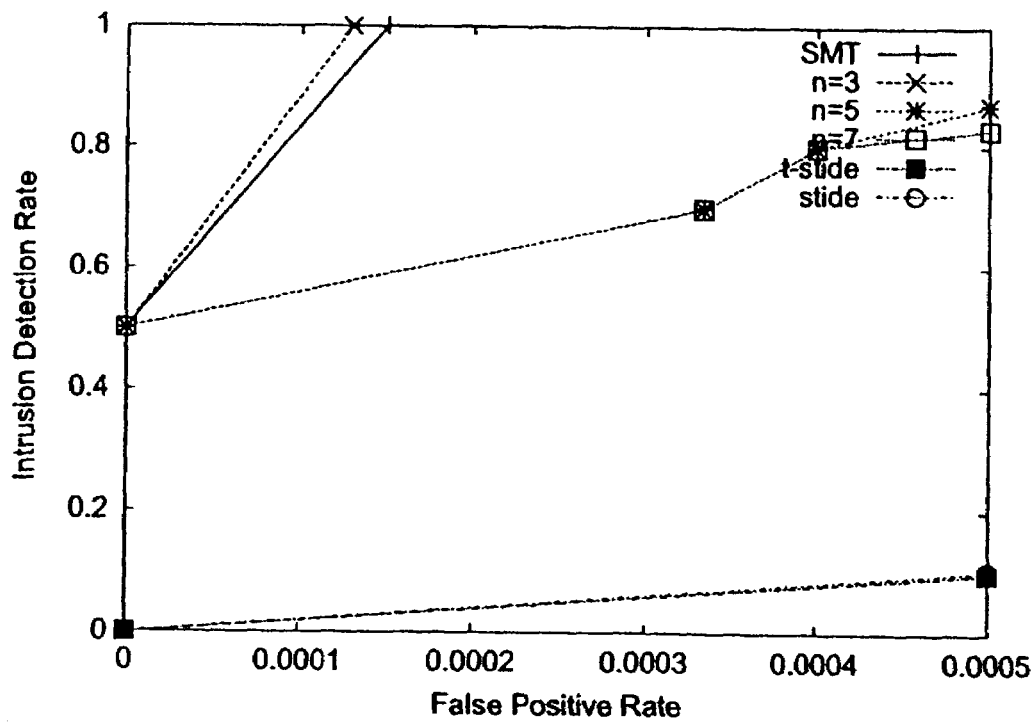
Figure 12:
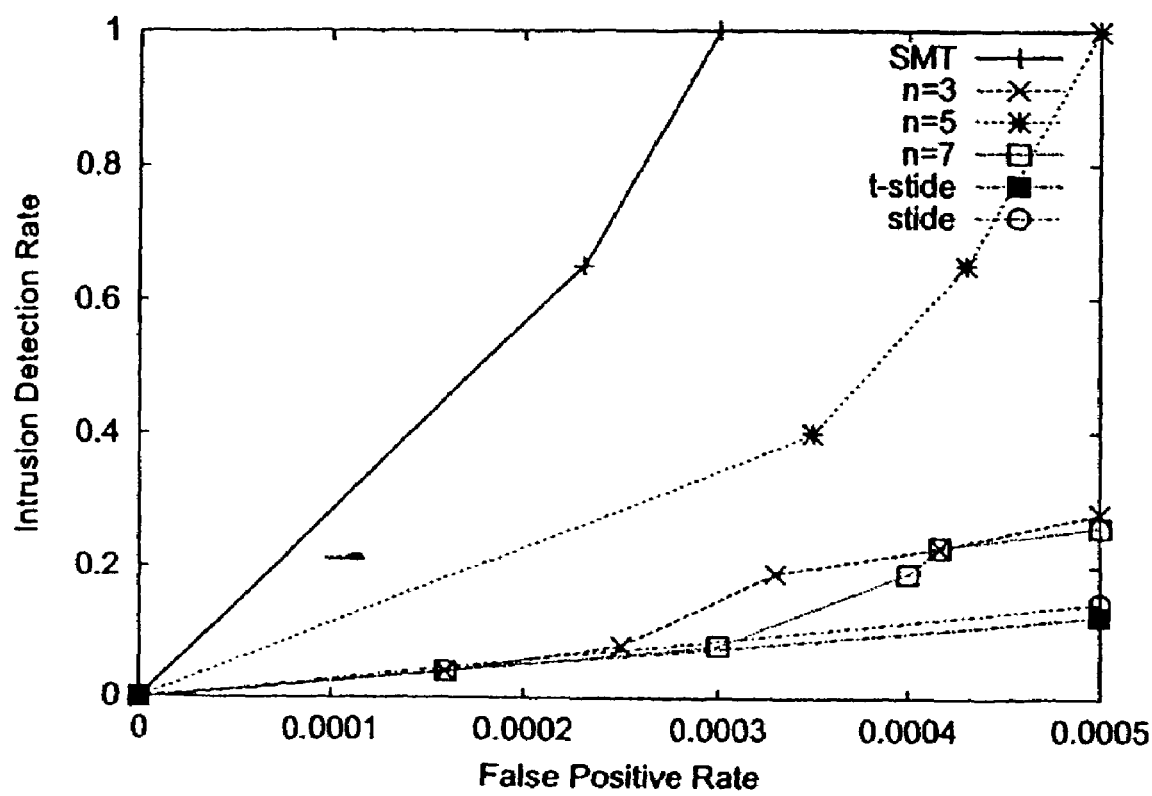
Figure 13:
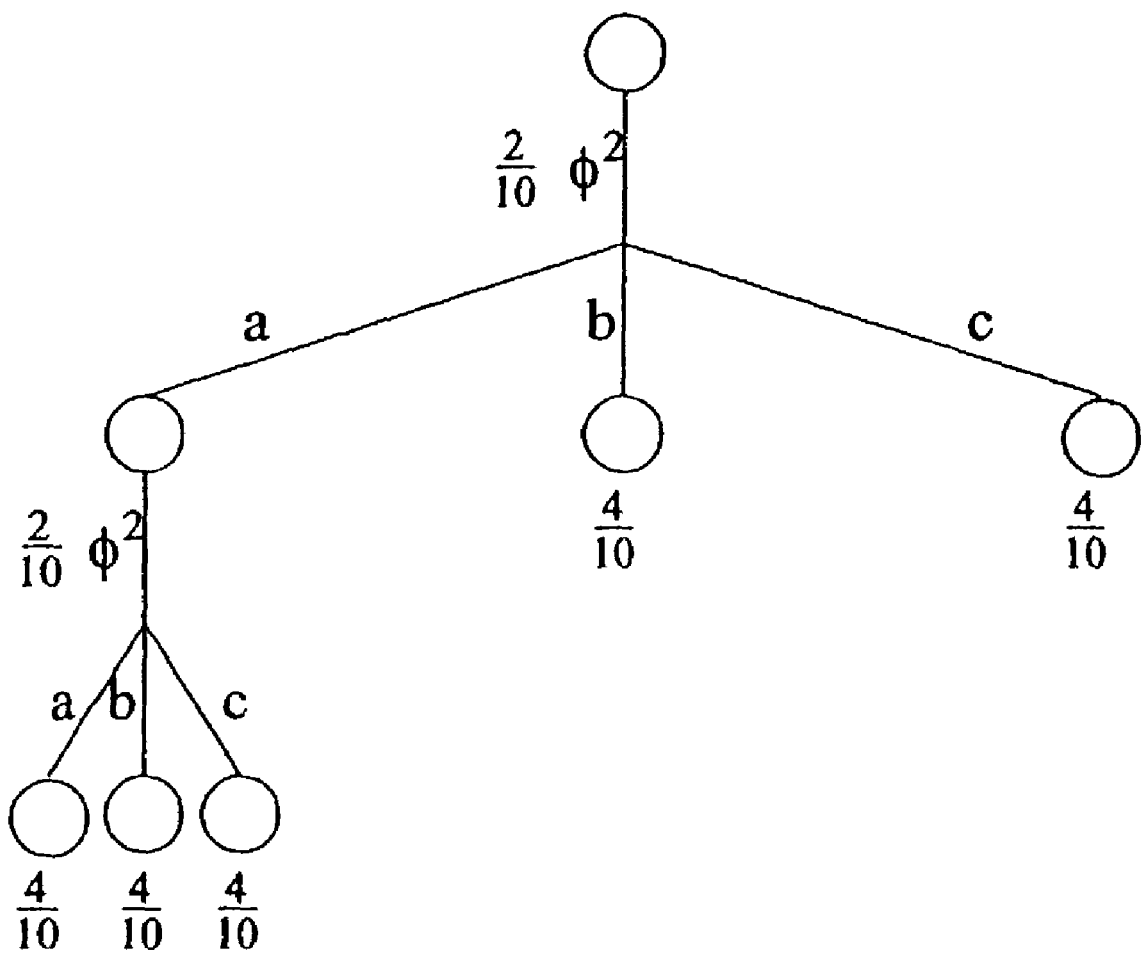
FIG. 13 is another exemplary sparse Markov tree in accordance with the present invention.

FIGS. 6–12 are ROC curves showing the comparison of SMTs, fixed window size prediction models, stide, and t-stide trained over the same data. The fixed window sizes used a window size of length 3, 5, and 7. The curves are obtained by varying the detection threshold. The curves show the comparison trained over the following sets of data: FIG. 6 ftpd, FIG. 7 ps (LL), FIG. 8 eject, FIG. 9 xlock, FIG. 10 named, FIG. 11 login, and FIG. 12 ps (UNM). FIGS. 6–12 show that different prediction models have If a process trace contains an anomaly, that process is declared an intrusion. An intrusion detected is considered detected if either the intrusion process is detected, or one of the processes spawned by the intrusion is detected.

The anomaly detection methods in both sets of experiments are compared using Receiver Operation Characteristic (ROC) curves which graph the false positive rate versus the detection rate (further details of ROC curves are described in F. Provost, T. Fawcett, and R Kohavi, "The Case Against Accuracy Estimation for Comparing Induction Algorithms," *Proceedings of the Fifteenth International Conference on Machine Learning*, July 1998 which is incorporated by reference in its entirety herein). The detection rate is the percentage of intrusions which are detected. In order to be consistent with previous published results on these data sets, the false positive rate is defined to be the percentage of normal system calls which are declared anomalous. The threshold of the methods is varied to obtain multiple points on the ROC curve. The ROC curves have few points because of the small amount of intrusion traces in each data set. In the ROC curves, the optimal detector is the graph closest to the y-axis, i.e., having the highest detection rate with minimum false positive rate.

FIGS. 6–12 are ROC curves showing the comparison of SMTs, fixed window size prediction models, stide, and t-stide trained over the same data. The fixed window sizes used a window size of length 3, 5, and 7. The curves are obtained by varying the detection threshold. The curves show the comparison trained over the following sets of data: FIG. 6 ftpd, FIG. 7 ps (LL), FIG. 8 eject, FIG. 9 xlock, FIG. 10 named, FIG. 11 login, and FIG. 12 ps (UNM). FIGS. 6–12 show that different prediction models have different levels of performance. The optimal window size is different for each process. In most cases the fixed window size methods are outperformed by the context dependent window size methods.

TABLE 1

Lincoln Labs Data Summary

| Program Name | # Intrusion Traces | # Intrusion System Calls | # Normal Traces | # Normal System Calls | % Intrusion Traces |
|---|---|---|---|---|---|
| ftpd | 1 | 350 | 943 | 66842 | 0.05% |
| ps (LL) | 21 | 996 | 208 | 35092 | 2.% |
| eject | 6 | 726 | 7 | 1278 | 36.3% |

TABLE 2

University of New Mexico Data Summary

| Program Name | # Intrusion Traces | # Intrusion System Calls | # Normal Traces | # Normal System Calls | % Intrusion Traces |
|---|---|---|---|---|---|
| xlock | 2 | 949 | 72 | 16,937,816 | 0.006% |
| named | 2 | 1,800 | 27 | 9,230,572 | 0.01% |
| login | 9 | 4,875 | 12 | 8,894 | 35.4% |
| ps (UNM) | 26 | 4,505 | 24 | 6,144 | 42.3% |

In general, the novel methods presented herein outperform t-stide and stide. The main difference between the novel methods described herein and t-stide and stde is the threshold. The novel methods use a probabilistic threshold while the other methods use the number of consecutive mismatches. Empirically, the probabilistic threshold outperforms the number of mismatch threshold even when the window size is the same as shown in FIGS. 6–12.

It will be understood that the foregoing is only illustrative of the principles of the invention, and that various modifications can be made by those skilled in the art without departing from the scope and spirit of the invention.

APPENDIX A

Prior Probability of a Tree

The initial mixture weights correspond to the prior probabilities of the trees. We define a randomized process that generates sparse prediction trees. The prior probability of a specific tree is the probability of generating that tree.

We define the stochastic process that generates the trees as follows. We start with a single root node. Based on the outcome of a probability distribution over non negative integers, $P_\phi(n \in N)$, we either make this node a leaf node if $n=0$, or add a branch labeled $\phi^{n-1}$ and a node for every symbol in $\Sigma$ if $n>0$. For each of these new nodes, we repeat the process recursively. We refer to this probability distribution as the generative probability distribution. Intuitively, this probabilistic event determines how far forward we look for the next input. If the outcome of the probabilistic event is 0, then we do not condition on any more inputs. If the value is 1, we condition on the next input. If the value is $n>0$, then we skip (or mark as wild-cards) the next $n-1$ inputs and condition on the nth input.

The generative probability distribution $P_\phi(\ )$ is dependent on the current node, u. We will denote this dependence as $P_\phi^u(\ )$. For each node u:

$$\sum_{i=0}^{\infty} P_\phi^u(i) = 1 \tag{A1}$$

For each node in a tree u, we denote the outcome of this probabilistic event as $u_\phi$ which represents the $\phi$ value of that node, i.e. the number of $\phi$'s +1 on the branch leaving the node. If a node is a leaf, $u_\phi$ of that node is defined to be 0.

For a tree T we define by $L_T$ to be the set of leaves of that tree. We also define $N_T$ to be the set of nodes of the tree. Similarly, we define $N_{Tu}$ and $L_{Tu}$ to be the set of nodes and leaf nodes respectively of a subtree rooted at node u.

The prior probability of a tree can easily be computed using the generative probability distribution at each node and the $\phi$ value of each node. For a tree, T, the prior probability of tree, $w_T^1$. is then:

$$w_T^1 = \prod_{u \in N_T} P_\phi^u(u_\phi) \tag{A2}$$

where $u_\phi$ is the $\phi$ value of the node u and $P_\phi^u$ is the generative probability distribution at the node.

For example, if $$P_\phi(n) = \frac{4-n}{10}$$

for $0 \le n \le 3$ and $P_\phi(n)=0$ otherwise, FIG. 14 shows the generative probability at each node. In this example, the generative probability does not depend on the specific node u. The probability of the tree would be the product of the generative probability at the nodes which is 0.004096.

The initial mixture weights are defined to be these prior probabilities, $w_T^1$.

The generative probability distribution $P_\phi(\ )$ can be used to define the parameters MAX_PHI and MAX_DEPTH. For example, for a node u with depth(u)=MAX_DEPTH, the node must be a leaf node, thus $P_\phi(0)=1$.

Weight Update Algorithm

Updating the weights for each tree at every time t is expensive. The update algorithm can be made more efficient if weights are assigned to individual nodes of the template tree which can be updated in a more efficient manner. The mixture weights are then calculated using the node weights.

For each node u we define a weight at time t as follows:

$$w^1(u)=1 \tag{A3}$$

and $$w^{t+1}(u)=w^t(u)P(x_{t+1}|u) \tag{A4}$$

when $x^t \in u$ and otherwise $w^{t+1}(u)=w^t(u)$.

Using these weights we can represent the mixture weights.

$$w_T^t = w_T^1 \prod_{1 \le i \le t} P_T(x_{t+1}|x^i) = \left(\prod_{u \in N_T} P_\phi^u(u_\phi)\right)\left(\prod_{e \in L_T} w^t(e)\right) \tag{A5}$$

In order to make predictions using the mixture (equation (3)), we must keep track of the sum of all the tree weights at time t, $\Sigma_T w_T^t$. An efficient way to do this is to keep the sum of all subtree weights for each node. We define $\overline{w}^t(u)$ to be the sum of all subtrees rooted at node u:

$$\overline{w}^t(u) = \sum_{T_u}\left(\left(\prod_{e \in N_{T_u}} P_\phi^e(e_\phi)\right)\left(\prod_{v \in L_{T_u}} w^t(v)\right)\right) = \sum_{T_u} w_{T_u}^t \tag{A6}$$

We can use these subtree weights to compute the sum of all tree weights $\Sigma_T w_T^t$ at time t. Note that the sum of all subtrees rooted at the root node is the sum of all subtrees in the prediction tree:

$$\overline{w}^t(\lambda) = \sum_T\left(\left(\prod_{u \in N_T} P_\phi^u(u_\phi)\right)\left(\prod_{v \in L_T} w^t(v)\right)\right) = \sum_T w_T^t \tag{A7}$$

In order to efficiently update the subtree weights we use the following Lemma.

Lemma 1 The following equation holds:

$$\overline{w}^t(u) = P_\phi^u(0)w^t(u) + \sum_{i=1}^\infty P_\phi^u(i)\prod_{\sigma \in \Sigma} \overline{w}^t(u\phi^{i-1}\sigma) \tag{A8}$$

Proof: We can decompose the summation over all subtrees rooted at u based on the φ value of the root node u. If the φ value is 0, there is a single tree with only one leaf node which consists of single node u. In this case the subtree weight is:

$$\prod_{e \in N_{T_u}} P_\phi^e(e_\phi) \prod_{e \in N_{T_u}} w^t(e) P_\phi^u(0) w^t(u) \tag{A9}$$

Let us assume that the φ value of the node u is i>0. In this case, a subtree $T_u$ rooted at u is a combination of the node u and a subtree rooted $u\phi^{t-1}\sigma$ for each $\sigma \in \Sigma_{in}$. We denote these subtrees $T_{u\phi^{t-1}\sigma}$. The set of leaf nodes of the subtree rooted at u will be the union of the leaf nodes of these subtrees. Similarly, the set of nodes of $T_u$ will be the union of the set of nodes of these subtrees and the node u itself. Using this fact we can represent for such $T_u$:

$$w_{T_u}^t = P_\phi^u(i)\prod_{\sigma \in \Sigma} w_{T_{u\phi^{i-1}\sigma}}^t \tag{A10}$$

Let $k=|\Sigma_{in}|$. Using the above equation:

$$\overline{w}^t(u) = P_\phi(0)w^t(u) + \sum_{i=1}^\infty \sum_{T_{u\phi^{i-1}\sigma_1}} \cdots \tag{A11}$$

$$\sum_{T_{u\phi^{i-1}\sigma_k}} P_\phi(i) w_{T_{u\phi^{i-1}\sigma_1}}^t \cdots w_{T_{u\phi^{i-1}\sigma_k}}^t =$$

$$P_\phi(0)w^t(u) + \sum_{i=1}^\infty P_\phi(i)\prod_{\sigma \in \Sigma}\sum_{T_{u\phi^{i-1}\sigma}} w_{T_{\phi^{i-1}\sigma}}^t$$

Thus $$\overline{w}^t(u) = P_\phi^u(0)w^t(u) + \sum_{i=1}^\infty P_\phi^u(i)\prod_{\sigma \in \Sigma} \overline{w}^t(u\phi^{i-1}\sigma) \tag{A12}$$

Efficient Weight Update Rules

To update the weights of the nodes we use the following rules. We first initialize $w^1(u)=1$ for $\forall u$ and $\overline{w}^1(u)$ for $\forall u$.

For $w^t(u)$ if $x^t \in u$:

$$w^{t+1}(u)=w^t(u)P(|u) \tag{A13}$$

and otherwise:

$$w^{t+1}(u)=w^t(u) \tag{A14}$$

For $\overline{w}^t(u)$ if $x^t \in u$:

$$\overline{w}^{t+1}(u) = P_\phi^u(0)w^{t+1}(u) + \sum_{i=1}^\infty P_\phi^u(i)\prod_{\sigma \in \Sigma} \overline{w}^{t+1}(u\phi^{i-1}\sigma) \tag{A15}$$

and otherwise:

$$\overline{w}^{t+1}(u)=\overline{w}^t(u) \tag{A16}$$

Notice that each input string $x^t$ corresponds to many nodes u because of the φ symbols in the path of u.

Prediction

We can use node weights for efficiently computing the prediction of the mixture. For any $\hat{x}_{t+1} \in \Sigma$, the probability of prediction of $\hat{x}_{t+1}$ at time t is:

$$P(\hat{x}_{t+1}|x^t) = \frac{\sum_T w_T^t P_T(\hat{x}_{t+1}|x^t)}{\sum_T w_T^t} \quad (A17)$$

If we set $x_{t+1} = \hat{x}_{t+1}$, then we have $$P(\hat{x}_{t+1}|x^t) = \frac{\sum_T w_T^t P_T(x_{t+1}|x^t)}{\sum_T w_T^t} = \frac{\sum_T w_T^{t+1}}{\sum_T w_T^t} = \frac{\overline{w}_T^{t+1}(\lambda)}{\overline{w}^t(\lambda)} \quad (A18)$$

Thus the prediction of the SMT for an input sequence and output symbol is the ratio of the weight of the root node if the input sequence and output symbol are used to update the tree to the original weight.

APPENDIX B

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

```c
/******************************************************************
 * Node.c
 * SMT - Sparse Markov Transducers
 * Copyright (C) 2000 Eleazar Eskin
 ******************************************************************/
#include <stdlib.h>
#include <stdio.h>
#include <math.h>
#include <string.h>
#include "includes.h"
// This method recursively updates a node using an input string and an
// output value. The length of the input string is passed to the
// function.
// This version of method uses log probabilities to avoid underflow.
double updateL(struct node *currentNode, int *inputs, int output, int
length, double learningRate, int update) {
    int i,j, *createdNode, *offTree;
    double temp, minLi;
    struct node *nextNode;
    int newUpdate;
    double newLi[MAX_PHIS];
    double newLBar;
    double prediction,offtreePrediction;
    //The prediction is P(y_t | u). We use the UPDATE flag to have the
    //predictor get updated by this training example.
    if (update & OFFTREE) {
        offtreePrediction=predict(¤tNode->outputProb, output, 0,
1.0);
        if (PRINT_PREDICTION_COMPONENTS && ((UPDATE & update)==0))
            printComponentPrediction(currentNode,offtreePrediction, 0.0,
output,TRUE,length);
        return -log(offtreePrediction)*learningRate;
    }
    prediction = predict(¤tNode->outputProb, output, update,
globOutputSymbols->updateAmounts[output]);
    length=min(MAX_DEPTH-currentNode->depth,length);
    //Weight Update for node weights
    //L_0^(t+1) =L_0^(t)-log(P(y_t| u))
    //  Equivalent to equation A13 in Appendix A //
    newLi[0]=currentNode->li[0]-log(prediction)*learningRate;
    if (update & UPDATE) {
        currentNode->li[0]=newLi[0];
    }
    //Weight Update for subtree weights
    for (i=1; i<MAX_PHIS; i++) {
        // We check to see if the subtree CAN exist. In this case the
prior
        // would be positive. If the prior is 0, then the subtree cannot
        // contribute to lBar.
        if (computePrior(currentNode,i)>0) {
            // If there are any more inputs left, we will follow the next
node.
            // And recursively compute this nodes subtree weight.
            if (i<=length) {
                // The next node is computed by the number of skips and
                // what the next symbol would be given that many skips.
                createdNode=malloc(sizeof(int));
                offTree=malloc(sizeof(int));
                *createdNode=FALSE;
```

-continued

```
      *offTree=FALSE;
      nextNode = follow(currentNode, i-1, *(inputs+(i-1)), update,
inputs+(i-1), output, length-(i-1), learningRate, createdNode,
offTree);
      newUpdate=update;
      if (*createdNode==TRUE)
        newUpdate = update;
      if (*offTree==TRUE)
        newUpdate = update | OFFTREE;
      if (PRINT_PREDICTION_COMPONENTS && ((UPDATE & update)==0)) {
        for (j=currentNode->depth; j<currentNode->depth+i-1; j++) {
          pathHistory[j]=-1;
          pathPriors[j]=1.0;
          pathLi[j]=0.0;
        }
        pathHistory[j]=*(inputs+(i-1));
        pathPriors[j]=computePrior(currentNode, i);
        pathLi[j]=-(currentNode->lBar-currentNode->li[i]);
      }
// Equivalent to equation A15 in Appendix A //
      temp=currentNode->li[i]-nextNode->lBar;
      // The nextNode's subtree weight is computed via a recursive call.
      // and this us used to set the current nodes subtree weight.
      newLi[i]=temp+updateL(nextNode, inputs+i, output, length-i,
learningRate, newUpdate);
      if (*createdNode==TRUE)
        freeNode(nextNode);
      free(createdNode);
      free(offTree);
      if (update & UPDATE)
        currentNode->li[i]=newLi[i];
      } else {
      newLi[i]=currentNode->li[i];
      }
    }
  }
  // We only need to sum them up if there is more than 1
  if (length>0) {
    // We compute the minimum subtree component.
    minLi=newLi[0];
    for (i=1; i<MAX_PHIS; i++) {
      if (newLi[i]<minLi && computePrior(currentNode,i)>0) {
        minLi=newLi[i];
      }
    }
    //lBar = maxLi -log(sum_i(e^(maxLi-Li)))
    temp=0;
    for (i=0; i<MAX_PHIS; i++) {
      if (computePrior(currentNode,i)>0) {
        // We make an approximation to avoid underflow. If the term is
        // insignificant, we do not use it because it will not affect
        // the final result.
        // Equivalent to equation A15 in Appendix A //
        if (newLi[i]-minLi<1000) {
          temp=temp+exp(minLi-newLi[i]);
        }
      }
    }
    newLBar=minLi-log(temp);
  } else {
    newLBar=newLi[0];
  }
  if (PRINT_PREDICTION_COMPONENTS && ((UPDATE & update)==0)) {
    printComponentPrediction(currentNode,prediction,-(currentNode-
>lBar-currentNode->li[0]), output,FALSE,length);
  }
  if (update &UPDATE) {
    currentNode->lBar=newLBar;
  }
  // We return the subtree weight to the caller of the function.
  //printf("newLbar = %f depth = %d\n",newLBar,currentNode->depth);
  return newLBar;
}
```

What is claimed is:

1. A method for monitoring a sequence of operations during execution of a process on a computer system to detect an anomaly in said sequence of operations, comprising:
   a) defining a probabilistic detection model configured to determine a predictive probability of an occurrence of a final operation in a sequence of operations conditional on a calculated number of previous operations in said sequence of operations, wherein said calculated number of previous operations is determined from a plurality of predetermined sequences of operations;
   b) determining said predictive probability for said final operation in said sequence of operations with said probabilistic detection model;
   c) if said predictive probability is below a predetermined threshold, identifying said sequence of operations as an intrusion, thereby detecting an anomaly in said sequence of operations,
   wherein the step of defining said probabilistic detection model comprises defining a plurality of sparse prediction trees for determining a predictive probability of said final operation, each said sparse prediction tree comprising a plurality of nodes consisting of a root node, leaf nodes, and branch nodes intermediate to said root node and said leaf nodes such that each of said predetermined sequences of operations defines a path from said root node to one of said leaf nodes and providing a respective weight to each of said sparse prediction trees.

2. A method for monitoring a sequence of operations during execution of a process on a computer system to detect an anomaly in said sequence of operations, comprising:
   a) defining a probabilistic detection model configured to determine a predictive probability of an occurrence of a final operation in a sequence of operations conditional on a calculated number of previous operations in said sequence of operations, wherein said calculated number of previous operations is determined from a plurality of predetermined sequences of operations;
   b) determining said predictive probability for said final operation in said sequence of operations with said probabilistic detection model;
   c) if said predictive probability is below a predetermined threshold, identifying said sequence of operations as an intrusion, thereby detecting an anomaly in said sequence of operations,
   wherein the step of defining said probabilistic detection model comprises defining a plurality of sparse prediction trees for determining a predictive probability of said final operation, each said sparse prediction tree comprising a plurality of nodes consisting of a root node, leaf nodes, and branch nodes intermediate to said root node and said leaf nodes such that each of said predetermined sequences of operations defines a path from said root node to one of said leaf nodes and providing a respective weight to each of said sparse prediction trees; and
   wherein the step of defining said probabilistic model further comprises defining said predictive probability of said probabilistic model as a weighted sum of the predictive probabilities determined by all of said plurality of sparse prediction trees divided by a sum of all of the respective weights.

3. The method as recited in claim 1, wherein the step of defining said probabilistic model further comprises updating the weights of each of said sparse prediction trees with predetermined sequences of operations.

4. A method for monitoring a sequence of system calls performed during execution of a process on a computer system to detect an anomaly in said sequence of system calls, comprising:
   a) defining a probabilistic detection model configured to determine a predictive probability of an occurrence of a final system call in a sequence of system calls conditional on a calculated number of previous system calls in said sequence of system calls, wherein said calculated number of previous system calls is determined from a plurality of predetermined sequences of system calls;
   b) determining said predictive probability for said final system call in said sequence of system calls with said probabilistic detection model;
   c) if said predictive probability is below a predetermined threshold, identifying said sequence of system calls as an intrusion, thereby detecting an anomaly in said sequence of system calls.
   wherein the step of defining said probabilistic detection model comprises defining a plurality of sparse prediction trees for determining a predictive probability of said final system call, each said sparse prediction tree comprising a plurality of nodes consisting of a root node, leaf nodes, and branch nodes intermediate to said root node and said leaf nodes such that each of said predetermined sequences of system calls defines a path from said root node to one of said leaf nodes and providing a respective weight to each of said sparse prediction trees.

5. A method for monitoring a sequence of system calls during execution of a process on a computer system to detect an anomaly in said sequence of system calls, comprising:
   a) defining a probabilistic detection model configured to determine a predictive probability of an occurrence of a final system call in a sequence of system calls conditional on a calculated number of previous system calls in said sequence of system calls, wherein said calculated number of previous system calls is determined from a plurality of predetermined sequences of system calls;
   b) determining said predictive probability for said final system call in said sequence of system calls with said probabilistic detection model;
   c) if said predictive probability is below a predetermined threshold, identifying said sequence of system calls as an intrusion, thereby detecting an anomaly in said sequence of system calls,
   wherein the step of defining said probabilistic detection model comprises defining a plurality of sparse prediction trees for determining a predictive probability of said final system call, each said sparse prediction tree comprising a plurality of nodes consisting of a root node, leaf nodes, and branch nodes intermediate to said root node and said leaf nodes such that each of said predetermined sequences of system calls defines a path from said root node to one of said leaf nodes and providing a respective weight to each of said sparse prediction trees; and
   wherein the step of defining said probabilistic model further comprises defining said predictive probability of said probabilistic model as a weighted sum of the predictive probabilities determined by all of said plurality of sparse prediction trees divided by a sum of all of the respective weights.

6. The method as recited in claim 4, wherein the step of building said probabilistic model further comprises recursively updating the weights of each of said sparse prediction trees with predetermined sequences of system calls.

7. A system for monitoring: a sequence of operations performed during execution of a process on a computer system to detect an anomaly in said sequence of operations, comprising:
   a) a probabilistic detection model generator configured to determine a predictive probability of an occurrence of a final operation in said sequence of operations conditional on a calculated number of previous operations in said sequence of operations said calculated number of previous operations is determined from a plurality of known sequences of operations, and
   b) an intrusion detector configured to determine said predictive probability for said final operation in said sequence of operations by using said probabilistic detection model: and if said predictive probability is below a predetermined threshold, to identify said sequence of operations as an intrusion, thereby detecting an anomaly in said sequence of operations,
   wherein said probabilistic detection model generator is configured to build a sparse prediction tree comprising: a rooted tree having a plurality of nodes consisting of a root node, leaf nodes, and branch nodes intermediate to said root node and leaf nodes such that a path from said root node to one of said leaf nodes represents a predetermined sequence of operations, and
   wherein said probabilistic detection model generator is configured to provide a plurality of said sparse prediction trees and providing a weight to each of said sparse prediction trees.

8. The system as recited in claim 7, wherein said probabilistic detection model generator is configured to recursively updating the weights of each of said sparse prediction trees.

9. The system as recited in claim 7, wherein said sequence of operations is a sequence of system calls.

10. The method as recited in claim 1, wherein the step of defining each said sparse prediction tree further comprises associating a probability distribution over each of said predetermined sequence of operations with each of said leaf nodes.

11. The method as recited in claim 10, wherein the step of defining each said sparse prediction tree comprises associating a path between adjacent nodes with a predetermined operation.

12. The method as recited in claim 10, wherein the step of defining each said sparse prediction tree comprises defining a path between adjacent nodes as a wildcard associated with any operation.

13. The method as recited in claim 4, wherein the step of defining each said sparse prediction tree further comprises associating a probability distribution over each of said predetermined sequence of system calls with each of said leaf nodes.

14. The method as recited in claim 13, wherein the step of defining each said sparse prediction tree comprises associating a path between adjacent nodes with a predetermined system call.

15. The method as recited in claim 13, wherein the step of defining each said sparse prediction tree comprises defining a path between adjacent nodes as a wildcard associated with any system call.

16. The system as recited in claim 7, wherein said probabilistic detection model generator is configured to associate a probability distribution over a predetermined sequence of operations by following said predetermined sequence of operations from said root node to one of said leaf nodes.

17. The method as recited in claim 16, wherein said probabilistic detection model generator is configured to associate each leaf node with said probability distribution of said predetermined sequence of operations.

18. The system as recited in claim 17, wherein said probabilistic detection model generator is configured to associate a path between adjacent nodes with a predetermined operation.

19. The system as recited in claim 18, wherein said probabilistic detection model generator is configured to define a path between adjacent nodes as a wildcard associated with any operation.

* * * * *